Oct. 26, 1965   E. D. WALTON   3,213,690

BALANCING SYSTEM

Filed Dec. 5, 1962

INVENTOR.
Edgar D. Walton
BY
Hugh L. Fisher
ATTORNEY

United States Patent Office 3,213,690
Patented Oct. 26, 1965

3,213,690
BALANCING SYSTEM
Edgar D. Walton, Birmingham, Mich., assignor to General Motors Corporation, Detroit, Mich., a corporation of Delaware
Filed Dec. 5, 1962, Ser. No. 242,412
14 Claims. (Cl. 73—462)

This invention relates to improvements in a control system adapted for use, although not exclusively, in balancing systems.

Among the different steps involved in the dynamic balancing of a workpiece are the two basic ones involving first, the measurement of the unbalance, and second, the indexing of the workpiece to the proper position for correcting the unbalance. During the measurement step, the workpiece must necessarily be revolved at the speed required for dynamic balancing. Next, the workpiece must be removed from this station and transferred to the next station when the workpiece is revolved the measured angular amount relative to a reference. In the past, these two steps have required two complete sets of apparatus. Therefore, it is proposed by the invention to combine these two steps in a unique and simple way so as to eliminate the need for one of the sets of apparatus. More specifically, it is proposed to employ a single station for first, measuring the location of the unbalance in a workpiece and thereafter, indexing the workpiece the proper measured amount for correction purposes.

The invention further contemplates a novel control system that obtains motion information during one cycle and thereafter uses this information to control motion during another cycle.

By the proposed control system, a characteristic of an element can be ascertained when operating a motor at some predetermined speed; subsequently, the control system operates the same motor in accordance with the measured characteristic.

Additionally, it is proposed to provide a unique arrangement for controlling a single motor during two different cycles of operation. During one cycle the motor is operated in one way and during another cycle, the motor performs in a different way.

Figure 1:
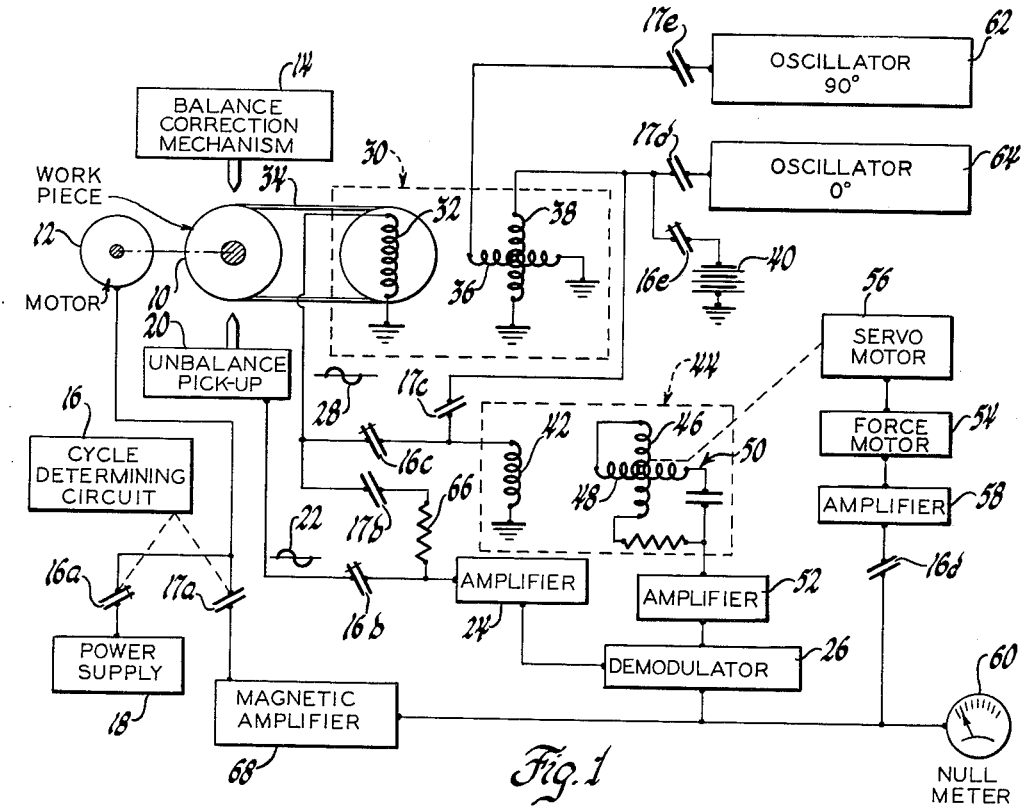
Figure 2:
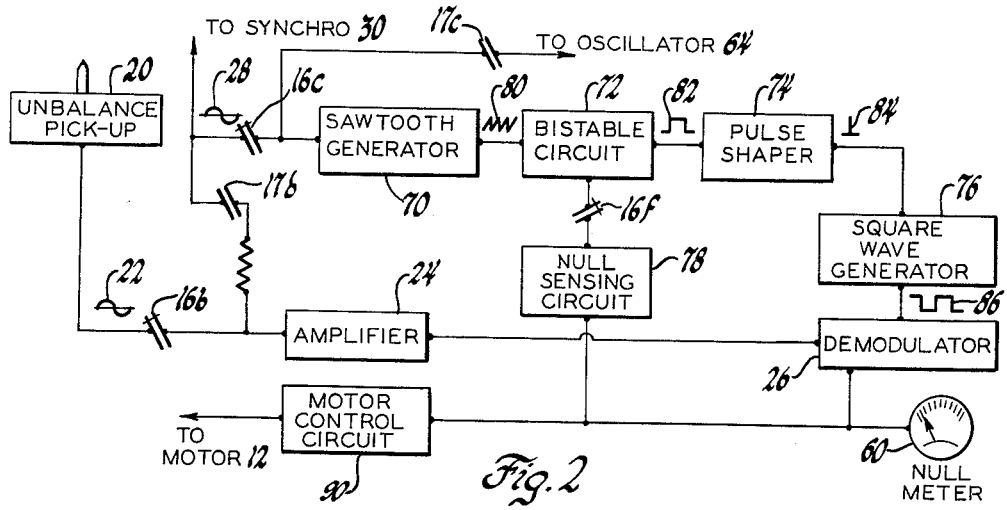

The foregoing and other objects and advantages of the invention will be apparent from the following description and from the accompanying drawings in which:

FIGURE 1 is a diagram of a balancing system incorporating the features of the invention; and FIGURE 2 is a diagram of a modification of the FIGURE 1 balancing system.

Referring now to the drawings in detail and particularly to FIGURE 1, only that part of the FIGURE 1 balancing system required to demonstrate the invention is shown and will hereinafter be described. A complete and automatic system is shown and described in patent application Serial No. 235,380 to Trimble, filed Nov. 5, 1962, and may be referred to for specific details.

In FIGURE 1, the numeral 10 designates generally a workpiece whose unbalance is to be corrected. During an unbalance measuring cycle, the workpiece 10 is revolved by a motor 12 at the speed required to determine the amount of unbalance and its angular location. Upon completion of the unbalance measuring cycle, the same motor 12 is utilized during an indexing cycle to accurately position the workpiece 10 relative to a balance correction mechanism 14. The mechanism 14 eliminates the unbalance either by adding or subtracting material at the point of the unbalance in any known way.

As mentioned, the motor 12 is used both during the unbalance measuring cycle and the indexing cycle. The determination of which cycle is to be effective is made by a suitable cycle determining circuit 16, which operates a series of normally closed contacts 16a, 16b, 16c, 16d, and 16e and normally open contacts 17a, 17b, 17c, 17d, and 17e in a sequence to be explained. The cycle determining circuit 16 can be adjusted manually or automatically by the use of a timer or a similar device, which indicates a cycle has been completed and another one can be commenced.

Considering first the unbalance measuring cycle, the circuit 16 is adjusted or adjusts so that all of the various mentioned contacts assume their indicated status. Consequently, the motor 12 is connected via closed contacts 16a to a suitable power supply 18 such that the motor 12 will revolve the workpiece 10 at the necessary speed for determining the dynamic unbalance. With the workpiece 10 revolving at the balancing speed, the control system becomes effective and an unbalance pickup 20, which may be operated magnetically, photoelectrically, or in any other known way, responds to any unbalance in the workpiece 10 and develops a corresponding sinusoidal unbalance signal 22. The unbalance signal 22 is transferred through normally closed contacts 16b to the input of an amplifier 24. The amplifier 24 is used to increase the strength of the unbalance signal 22, if needed. Thereafter, the amplified unbalance signal 22 is applied to one of the inputs of a detector, e.g., a demodulator 26. The demodulator 26 may be of the type disclosed in the King Patent 2,988,918 and operates to synchronously rectify the unbalance signal 22 in accordance with a reference; in this instance a reference signal 28, which has a frequency corresponding to the rotational speed of the workpiece 10 as will become apparent.

The reference signal 28 is initially developed by a motion responsive provision, e.g., a primary synchro 30, which is responsive to the angular motion of the workpiece 10. The synchro 30 has a rotor winding 32 revolvable in synchronism with the workpiece 10. This is done by appropriate mechanism, such as a belt drive 34, which affords a 1:1 ratio and which is provided with teeth or the equivalent for preventing slippage. The synchro 30 also includes a pair of stator windings 36 and 38, but during the unbalance measuring cycle, only the stator winding 38 is effective, for it is the only one connected through normally closed contacts 16e to a D.C. source, for instance a battery 40. Consequently, the primary synchro 30 will develop the sinusoidal shaped reference signal 28, which will have a frequency equal to the rotational speed of the workpiece 10.

This reference signal 28 from the rotor winding 32 is fed via normally closed contacts 16c through a single stator winding 42 for a secondary or a reference synchro 44. Synchro 44 has two rotor windings 46 and 48 tied together through a resistor-capacitor network 50, which affords the necessary phase variation for synchro action. The reference synchro 44 shifts the phase of the reference signal 28 as will be explained after which it is increased in strength, if necessary, by an amplifier 52 and then used as a reference by the demodulator 26 for chopping or synchronously rectifying the unbalance signal 22.

Due to the synchronous rectifying action of the demodulator 26, the average D.C. level of the output from the demodulator 26 will correspond to the difference in phases between the unbalance signal 22 and the reference signal 28. Since the reference signal 28 reflects an electrical zero due to the synchro action and since the unbalance signal 22 reflects the point of unbalance as well as the amount of the unbalance, the phase variation corresponds to the angular location of the unbalance relative to this electrical zero reference, which represents an imaginary point on the workpiece 10 as established by the alignment of the rotor winding 32 relative to the workpiece 10. Then merely by measuring the amount that the reference signal 28, e.g., must be shifted in order to produce a certain phase relationship between the unbalance signal 22 and the reference signal 28, the angular location of the unbalance in the workpiece 10 can be established. The phase shifting can be done by properly orienting the reference synchro 44 in any known way. In the FIGURE 1 system, this is the function of a force motor 54 and a fluid pressure operated motor 56. Accordingly, during the unbalance measuring cycle, the output from the demodulator 26 is transferred through normally closed contacts 16d and an amplifier 58, if required, to the force motor 54. The force motor 54 may be of the usual construction and functions to control fluid pressure application to the motor 56 in response to the polarity and the amplitude of the output from the demodulator 26. The motor 56, in turn, revolves the reference synchro rotor windings 46 and 48 in the direction required to shift the phase of the reference signal 28 and produce a null output from the demodulator 26.

When the output from the demodulator 26 has a null D.C. average level, the unbalance signal 22 is being chopped or rectified 90° after the point of zero voltage. Of course, with a null output from the demodulator 26, the reference signal 28 and the unbalance signal 22 are exactly 90° out of phase. A null meter 60, which visually indicates a null, can be calibrated for this as well as the control system itself. Therefore, the reference signal 28 is shifted 90° plus the angular difference between the angular location of the unbalance and the electrical zero reference established by the primary synchro 30.

Describing now the indexing cycle, it is established, as mentioned, by the cycle determining circuit 16 so that all of the various contacts change their illustrated status, i.e., the normally closed contacts 16a, 16b, 16c, 16d, and 16e open, and the normally open contacts 17a, 17b, 17c, 17d, and 17e close. Consequently, the synchro 30 has its stator windings 36 and 38 connected respectively by closed contacts 17e and 17d to the output of oscillators 62 and 64. These oscillators 62 and 64 have their outputs 90° out of phase and of a frequency that approximates that at which the workpiece 10 was revolved by the motor 12 during the unbalance measuring cycle. This eliminates any need for calibrating the control system for frequency variations. Additionally, the output of the oscillator 64 is applied through the closed contacts 17c to the stator winding 42 for the reference synchro 44. The output from the rotor winding 32 instead of being applied to the reference synchro 44 is now fed to the input of the amplifier 24 through closed contacts 17b and an attenuating resistor 66. At this time, the unbalance pickup 20 is not connected into the circuit because the contacts 16b have been opened. Hence, the output from the rotor winding 32 of the primary synchro 30 is supplied to the demodulator 26 in place of the unbalance signal 22 and represents the actual position of the workpiece 10 relative to a reference position or the position of the balance correction mechanism 14 as now established by the primary synchro 30.

Upon establishing the indexing cycle, the opening of the contacts 16d will cause the reference synchro 44 to remain in the position established during the unbalance measuring cycle. This position, as has been described, represents the amount the rotor windings 46 and 48 were turned by the motor 56 and also reflects the angular distance from the electrical zero reference point to the point of unbalance or the point at which the unbalance and reference signals 22 and 28 were 90° out of phase, and accordingly, the demodulator 26 had a null output. Actually, the output from the reference synchro 44 represents the location of the unbalance relative to the electrical zero reference point and the output from the primary synchro 30 represents the actual position of the workpiece 10 or the electrical zero reference point relative to the balance correction mechanism 14. The resultant output from the demodulator 26 affords a motor control signal that is, in effect, equivalent to the angular amount the workpiece 10 must be revolved from its actual position to the reference position in order to correct for the unbalance. The motor control signal is first fed to a magnetic amplifier 68 or the equivalent and then transferred through closed contacts 17a to the motor 12 and will cause the motor 12 to revolve the workpiece 10 in accordance with the average D.C. level of the motor control signal at this time. The workpiece 10 will be rotated until again the output from the demodulator 26 is nulled indicating that the output from the primary synchro 30 and the output from the reference synchro 44 have, as before described, the 90° phase relationship. When the output is null, the motor 12 will stop and the workpiece 10 will be properly positioned for correction of the unbalance by the balance correction mechanism 14.

Briefly summarizing the operation of the FIGURE 1 system, initially the cycle determining circuit 16 is set for the unbalance measuring cycle. Hence, the motor 12 will revolve the workpiece 10 at its proper unbalance measuring speed and the unbalance signal 22 will be developed. The unbalance signal 22 is fed to the demodulator 26 where it is synchronously rectified by the reference signal 28. Since the reference signal 28 is generated by the primary synchro 30 and reflects an electrical zero or an imaginary reference point on the workpiece 10, the synchronously rectified unbalance signal or the output from the demodulator 26 will have some average D.C. level that indicates the phase difference between the unbalance and reference signals 22 and 28. This output causes the motor 56 to adjust the reference synchro 44 until the output from the demodulator 26 is null. The final setting of the synchro 44 corresponds to the angular position of the unbalance relative to the electrical zero reference. In effect, the synchro 44 serves as a memory and retains this information for subsequent use during the indexing cycle.

With the synchro 44 properly set, the cycle determining circuit 16 initiates the indexing cycle whereupon the primary synchro 30 provides the demodulator 26 with a position signal corresponding to the actual position or angular location of the workpiece 10 relative to the reference position, which is, as stated, the position of the mechanism 14. At the demodulator 26, the position signal is synchronously rectified by the ouput from the reference synchro 44. The motor control signal developed by the demodulator 26 corresponds, also as stated, to the angular amount that the workpiece 10 must be revolved by the motor 12. Accordingly, the motor 12 responds to this motor control signal and revolves the workpiece 10 until the output from the primary synchro 30 and the output from the reference synchro 44 have the previously discussed phase relationship, and the demodulator 26 produces a null output. At this time, the point of unbalance in the workpiece 10 is properly aligned with the balance correction mechanism 14, and the correction step can be made.

In the FIGURE 2 system, the reference synchro 44 and the motor 56 have been replaced by a sawtooth generator 70, a bistable circuit 72, a pulse shaper 74, a square wave generator 76, and a null sensing circuit 78. Otherwise, the two systems are substantially the same; hence, the same numerals have been used. In the FIGURE 2 system, the reference signal 28 from the synchro 30 during the unbalance measuring cycle, drive the sawtooth generator 70 and develops a sawtooth signal 80. The sawtooth signal 80 switches a bistable circuit 72 between two levels of operation to produce a rectangular shaped signal 82 having on and off times determined by the bias level of the bistable circuit 72. This rectangular shaped signal 82 is shaped by the pulse shaper 74 into a trigger pulse 84, which is used to trigger the square wave generator 76 and develop a square wave signal 86 corresponding in phase and frequency to the reference signal 28. This square wave signal 86 synchronously rectifies the unbalance signal 22 in the demodulator 26 and, as in the FIGURE 1 system, an output is developed having an average D.C. level corresponding to the phase variation between the square wave signal 86 and the unbalance signal 22. This output is fed to the null sensing circuit 78 where a bias signal is developed. The bias signal is subsequently fed through normally closed contacts 16f to the bistable circuit 72. The bias signal changes the on and off times of the bistable circuit 72 and accordingly causes the trigger pulse 84 to be shifted in phase whatever amount is required for the correspondingly phase shifted square wave signal 86 to synchronously rectify the unbalance signal 22 so that a null average D.C. output is obtained from the demodulator 26. The structure and the functioning of the sawtooth generator 70, the bistable circuit 72, the pulse shaper 74, the square wave generator 76, and the null sensing circuit 78 are described in greater detail in the mentioned application S.N. 235,380.

When it is desired to index the workpiece 10 with the FIGURE 2 balancing system, the indexing cycle is initiated and the output from the null sensing circuit 78 is no longer applied to the bistable circuit 72 since the contacts 16f are open. Hence, the phase of the square wave signal 86 is maintained and it corresponds to the reference position, or the position to which the workpiece 10 must be revolved to be properly aligned with the balance correction mechanism 14. Therefore, the square wave signal 86 serves the same function as the output from the reference synchro 44 in the FIGURE 1 system. The output from the synchro 30 is also applied to the demodulator 26 where it is synchronously rectified to produce an output that corresponds to the angular amount the workpiece 10 must be turned from its actual position to the reference position or the position where the unbalance correction is to be made. This output is fed to a motor control circuit 90 where it can be amplified or otherwise modified in any known way for use by the motor 12 so as to produce a corresponding rotation of the workpiece 10 until the reference position and the actual position of the unbalance correspond, at which time the output from the demodulator 26 will be nulled as in the FIGURE 1 system. Therefore, the FIGURE 2 system accomplishes the same thing as the FIGURE 1 system while using an all electronic control system.

From the foregoing, it will be appreciated that two cycles basic to any dynamic balancing system are accomplished at one station and by using a single motor. This affords obvious advantages and is achieved automatically by a relatively simple control system. Moreover, the control system itself achieves motion control in a precise and accurate way, utilizing information obtained during one cycle for motion control during a subsequent cycle.

The invention is to be limited only by the following claims:

What is claimed is:

1. In a balancing system, the combination of a motor both for revolving a workpiece during an unbalance measuring cycle and for angularly locating the workpiece relative to a reference during an indexing cycle, means measuring the angle of unbalance in the workpiece during the unbalance measuring cycle and developing a control signal corresponding to the angular position of the unbalance relative to the reference during the indexing cycle, the motor being operative to revolve the workpiece in response to the control signal to angularly locate the workpiece in accordance with the angle of unbalance during the indexing cycle, and cycle determining means first establishing the unbalance measuring cycle and subsequently the indexing cycle.

2. In a balancing system, the combination of a motor revolving a workpiece at one speed during an unbalance measuring cycle and at a different speed while angularly locating the workpiece relative to a reference during an indexing cycle, control means measuring the angle of unbalance during the unbalance measuring cycle and developing a control signal corresponding to the angular position of the unbalance relative to the reference during the indexing cycle, the motor being operative to revolve the workpiece in response to the control signal to angularly locate the workpiece in accordance with the angle of unbalance during the indexing cycle, and means conditioning the motor and the control means for operation in the unbalance measuring and index cycles.

3. In combination; a motor revolving a workpiece at a predetermined speed during an unbalance measuring cycle and angularly locating the workpiece relative to a reference during an indexing cycle; control means measuring the angle of the unbalance in the workpiece during the unbalance measuring cycle and controlling the motor in accordance with the measured angle of unbalance during the indexing cycle; the control means including means responsive to the angular motion of the workpiece for developing a control signal corresponding to the angular position of the unbalance relative to the reference during the indexing cycle, the motor means being operative to revolve the workpiece in response to the control signal so as to angularly locate the workpiece relative to the reference in accordance with the measured angle of unbalance; and means conditioning the motor and the control means for operation in the unbalance measuring cycle and the indexing cycle.

4. In combination; a motor revolving a workpiece at a certain speed during an unbalance measuring cycle and angularly locating the workpiece relative to a reference during an indexing cycle; control means measuring the angle of unbalance in the workpiece during the unbalance measuring cycle and controlling the motor in accordance with the angle of unbalance during the indexing cycle; the control means including means responsive to the angular motion of the workpiece for developing a corresponding output and means utilizing the output for measuring the angle of unbalance during the unbalance measuring cycle and for developing a control signal corresponding to the angular location of the unbalance relative to the reference during the indexing cycle, the motor being operative to revolve the workpiece in response to the control signal to angularly locate the workpiece relative to the reference in accordance with the measured angle of unbalance during the indexing cycle; and means conditioning the motor and the control means for operation in the unbalance measuring cycle and the indexing cycle.

5. In combination; a motor revolving a workpiece at a predetermined speed during an unbalance measuring cycle and angularly locating the workpiece relative to a reference during an indexing cycle; control means measuring the angle of unbalance in the workpiece during the unbalance measuring cycle and controlling the motor in accordance with the angle of unbalance during the indexing cycle; the control means including means responsive to the angular motion of the workpiece and means cooperating with the motion responsive means to measure the angle of unbalance during the unbalance measuring cycle and to compare the angle of unbalance with the angular location of the workpiece and develop a corresponding index signal during the indexing cycle for operating the motor, the motor being operative to revolve the workpiece in response to the index signal so as to angularly locate the workpiece relative to the reference in accordance with the measured angle of unbalance; and means conditioning the motor and the control means for operation in the unbalance measuring cycle and the indexing cycle.

6. In combination; a motor revolving a workpiece at a predetermined speed during an unbalance measuring cycle and angularly locating the workpiece relative to a reference during an indexing cycle; control means measuring the angle of unbalance in the workpiece during the unbalance measuring cycle and controlling the motor in accordance with the angle of unbalance during the indexing cycle; the control means including means responsive to the angular motion of the workpiece for developing a reference signal having a frequency corresponding to the velocity at which the workpiece is revolved by the motor during the unbalance measuring cycle and for developing a position signal corresponding to the actual angular position of the workpiece during the indexing cycle, means generating an unbalance signal having the characteristics of the unbalance in the workpiece, and means detecting the difference in a certain characteristic of the unbalance and reference signals and developing a corresponding output representing the angle of unbalance during the unbalance measuring cycle and detecting the difference in a certain characteristic of the output and the position signal and developing a corresponding motor control signal during the indexing cycle for operating the motor, the motor being operative to revolve the workpiece in response to the control signal so as to angularly locate the workpiece relative to the reference in accordance with the measured angle of unbalance; and means conditioning the motor and the control means for operation in the unbalance measuring and the indexing cycles.

7. In combination; a motor revolving a workpiece at a predetermined speed during an unbalance measuring cycle and angularly locating the workpiece relative to a reference during an indexing cycle; control means measuring the angle of unbalance in the workpiece during the unbalance measuring cycle and controlling the motor in accordance with the angle of unbalance during the indexing cycle; the control means including means responsive to the angular motion of the workpiece for developing a reference signal having a frequency corresponding to the velocity at which the workpiece is revolved by the motor during the unbalance measuring cycle and for developing a position signal corresponding to the actual angular position of the workpiece relative to the reference during the indexing cycle, means generating an unbalance signal having the characteristics of the unbalance in the workpiece, means detecting the difference in phase between the unbalance and reference signals and developing a corresponding output representing the angle of unbalance during the unbalance measuring cycle, and means storing the output during the unbalance measuring cycle and supplying the output to the detecting means during the indexing cycle, the detecting means also detecting the difference in phase between the position signal and the output during the indexing cycle and developing a corresponding motor control signal for operating the motor, the motor being operative to revolve the workpiece in response to the motor control signal so as to angularly locate the workpiece relative to the reference in accordance with the measured angle of unbalance; and means conditioning the motor and the control means for operation in the unbalance measuring and the indexing cycles.

8. In combination; a motor revolving an element during one cycle and angularly locating the element relative to a reference during another cycle, means measuring a characteristic of the element during the one cycle and developing a control signal corresponding to the angular position of the characteristic relative to the reference during the another cycle, the motor means being operative to revolve the element in response to the control signal so as to angularly locate the element in accordance with the measured characteristic during the other cycle, and means determining the cycle to be operative.

9. In combination; a motor revolving a workpiece at a certain speed during one cycle of operation and angularly locating the workpiece relative to a reference during another cycle of operation; controls means measuring a characteristic of the workpiece during the one cycle and controlling the motor means in accordance with the characteristic measured during the other cycle; the control means including means responsive to the angular motion of the workpiece for developing a control signal corresponding to the angular position of the characteristic relative to the reference during the another cycle, the motor means being operative to revolve the workpiece in response to the control signal so as to angularly locate the workpiece in accordance with the measured characteristic; and means conditioning the motor means and the control means for operation in each cycle.

10. In combination; a motor revolving a workpiece at a predetermined speed during a first cycle and angularly locating the workpiece relative to a reference during a second cycle; control means measuring the angular position of a characteristic of the workpiece during the first cycle and controlling the motor means in accordance with the measured angular position during the second cycle; the control means including means responsive to the angular motion of the workpiece, means cooperating with the motion responsive means to measure the angular position of the characteristic of the workpiece during the first cycle and to compare the measured angular position with the actual angular location of the workpiece and develop a corresponding control signal during the second cycle for operating the motor means, the motor means being operative to revolve the workpiece in response to the control signal so as to angularly locate the workpiece in accordance with the measured angular position; and means conditioning the motor means in the control means for operation in the first and second cycles.

11. In combination; a motor revolving a workpiece at a predetermined speed during a first cycle and angularly locating the workpiece relative to a reference during a second cycle; control means measuring the angular position of a characteristic of the workpiece during the first cycle and controlling the motor in accordance with the measured angular position during the second cycle; the control means including means responsive to the angular motion of the workpiece for developing a reference signal having a frequency corresponding to the velocity at which the workpiece is revolved by the motor during the first cycle and for developing an angular position signal corresponding to the actual angular position of the workpiece relative to the reference during the second cycle, means generating an information signal corresponding to the measured angular position of the characteristic of the workpiece, means detecting the difference between the information and reference signals and developing a corresponding output signal representing a desired angular position of the workpiece during the first cycle and detecting the difference between the output signal and the position signal during the second cycle and developing a corresponding motor control signal for operating the motor, the motor being operative to revolve the workpiece in response to the motor control signal so as to angularly locate the workpiece in accordance with the measured angular position; and means conditioning the motor and the control means for operation in the first and second cycles.

12. In combination; a motor revolving a workpiece at a predetermined speed during an unbalance measuring cycle and angularly locating the workpiece relative to a balance correction mechanism during an indexing cycle; control means measuring the angle of unbalance in the workpiece during the unbalance measuring cycle and controlling the motor in accordance with the angle of unbalance during the indexing cycle; the control means including means responsive to the angular motion of the workpiece for developing a reference signal having a frequency corresponding to the velocity at which the workpiece is revolved by the motor during the unbalance measuring cycle and for developing a position signal corresponding to the actual angular position of the workpiece relative to the balance correction mechanism during the indexing cycle, means generating an unbalance signal having the characteristics of the unbalance in the workpiece, means comparing the phases of the unbalance and reference signals, and means shifting the phase of the reference signal so as to develop an unbalance position signal corresponding to the angular location of the unbalance in the workpiece for use during the indexing cycle, the comparing means also comparing the phases of the unbalance position signal and the position signals during the indexing cycle and developing a corresponding motor control signal for operating the motor, the motor being operative to revolve the workpiece in response to the motor control signal until a certain phase relation exists between the unbalance position and position signals and the workpiece is located relative to the balance correction mechanism; and means conditioning the motor and the control means for operation in the unbalance measuring and the indexing cycles.

13. In combination; a motor revolving a workpiece at a predetermined speed during an unbalance measuring cycle and angularly locating the workpiece relative to a balance correction mechanism for correction during an indexing cycle; control means measuring the angle of unbalance in the workpiece during the unbalance measuring cycle and controlling the motor in accordance with the angle of unbalance during the indexing cycle, the control means including pulse generating means having a rotor drive-connected to the motor and a stator so arranged that the generating means develops a reference signal having a frequency corresponding to the velocity at which the workpiece is revolved by the motor during the unbalance cycle and for developing a position signal corresponding to the actual angular position of the workpiece relative to the balance correction mechanism during the indexing cycle, means generating an unbalance signal having the characteristics of the unbalance in the workpiece, means comparing the phases of the unbalance and reference signals and developing a corresponding output representing the angular position of the unbalance in the workpiece during the unbalance measuring cycle, resolver means including a stator responsive to the reference signal during the unbalance measuring cycle and responsive to the position signal during the indexing cycle and a rotor, and means revolving the rotor in response to the output from the phase comparing means during the unbalance measuring cycle so as to shift phase of the reference signal until a null output is obtained from the phase comparing means and thereby cause the resolver means to provide an unbalance position signal corresponding to the angular location of the unbalance in the workpiece during the indexing cycle, the phase comparing means also comparing the phases of the position signal and the unbalance position signal during the indexing cycle and developing a corresponding motor control signal for operating the motor so as to revolve the workpiece until again a null output from the phase comparing means is obtained and the workpiece is positioned for correction by the balance correction mechanism; and means conditioning the motor and the control means for operation in the unbalance measuring and the indexing cycles.

14. In combination; a motor revolving a workpiece at a predetermined speed during an unbalance measuring cycle and angularly locating the workpiece relative to a balance correction mechanism for correction thereby during an indexing cycle; control means measuring the angle of unbalance in the workpiece during the unbalance measuring cycle and controlling the motor in accordance with the angle of unbalance during the indexing cycle, the control means including pulse generating means responsive to the angular motion of the workpiece for developing a reference signal having a frequency corresponding to the velocity at which the workpiece is revolved by the motor during an unbalance measuring cycle and developing a position signal corresponding to the actual angular position of the workpiece relative to the balance correction mechanism during the indexing cycle, means generating an unbalance signal having the characteristics of the unbalance in the workpiece, means phase-comparing the unbalance and reference signals and developing a corresponding output representing the angular position of unbalance in the workpiece during the unbalance measuring cycle, means responsive to the output and operatively connected to the pulse forming means for shifting the phase of the reference signal until a null output is obtained from the phase-comparing means so as to develop a corresponding unbalance position signal during the indexing cycle, the phase comparing means also comparing the phases of the position signal and the unbalance position signal during the indexing cycle and developing a corresponding motor control signal for operating the motor so that the motor revolves the workpiece in response thereto and until he workpiece is angularly located for correction by the balance correction mechanism; and means conditioning the motor and the control means for operation in the unbalance measuring and the indexing cycles.

References Cited by the Examiner

UNITED STATES PATENTS

| 2,933,984 | 4/60 | Hack | 73—463 |
| 2,947,173 | 8/60 | Lash | 73—464 |
| 2,990,717 | 7/61 | Federn | 73—463 |
| 3,037,403 | 6/62 | Hack et al. | 73—463 |

FOREIGN PATENTS 801,239   9/58   Great Britain.

OTHER REFERENCES

German application 1,071,373, Dec. 17, 1959.

RICHARD C. QUEISSER, *Primary Examiner.*

JAMES J. GILL, *Examiner.*